Patented Dec. 25, 1934

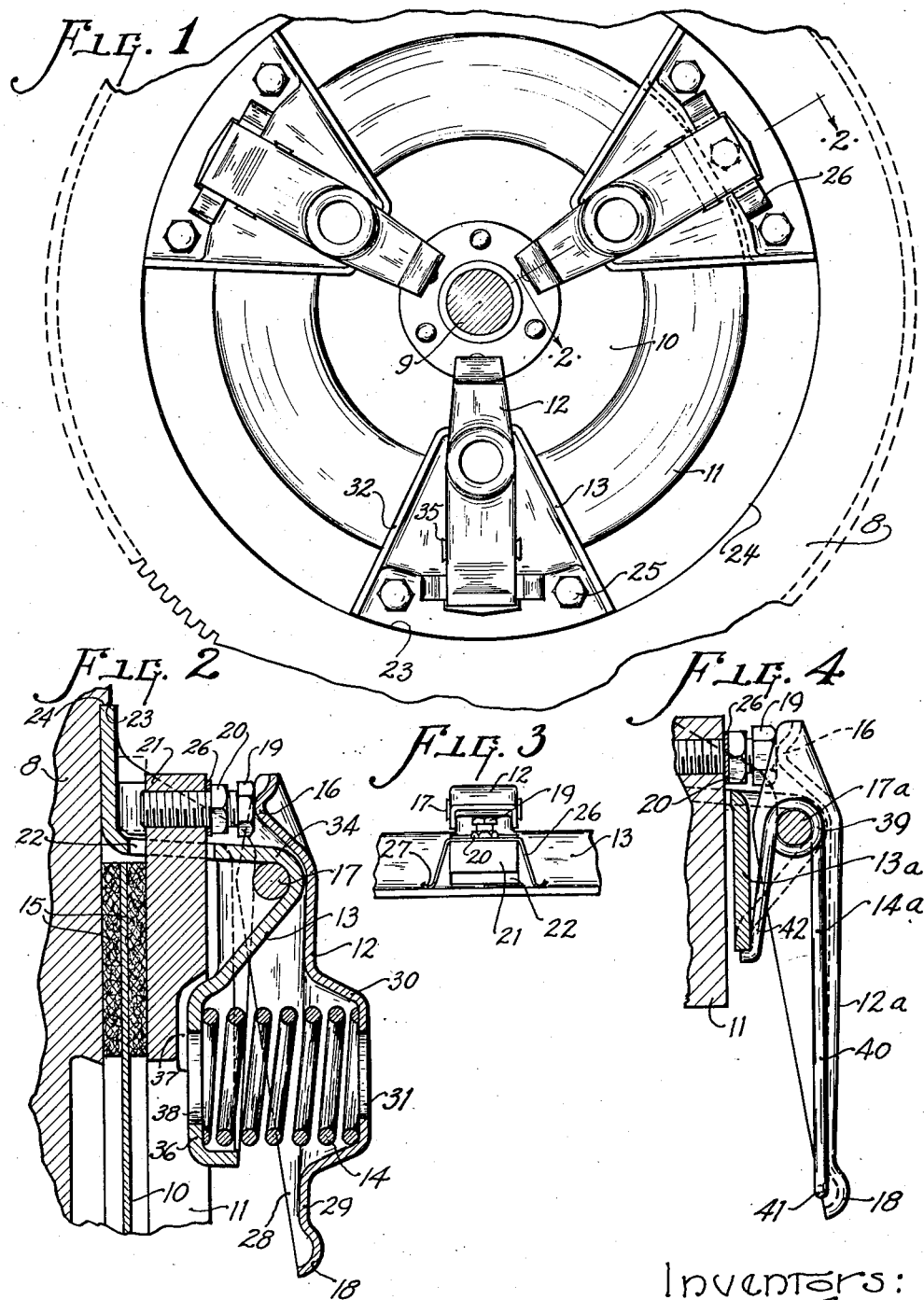

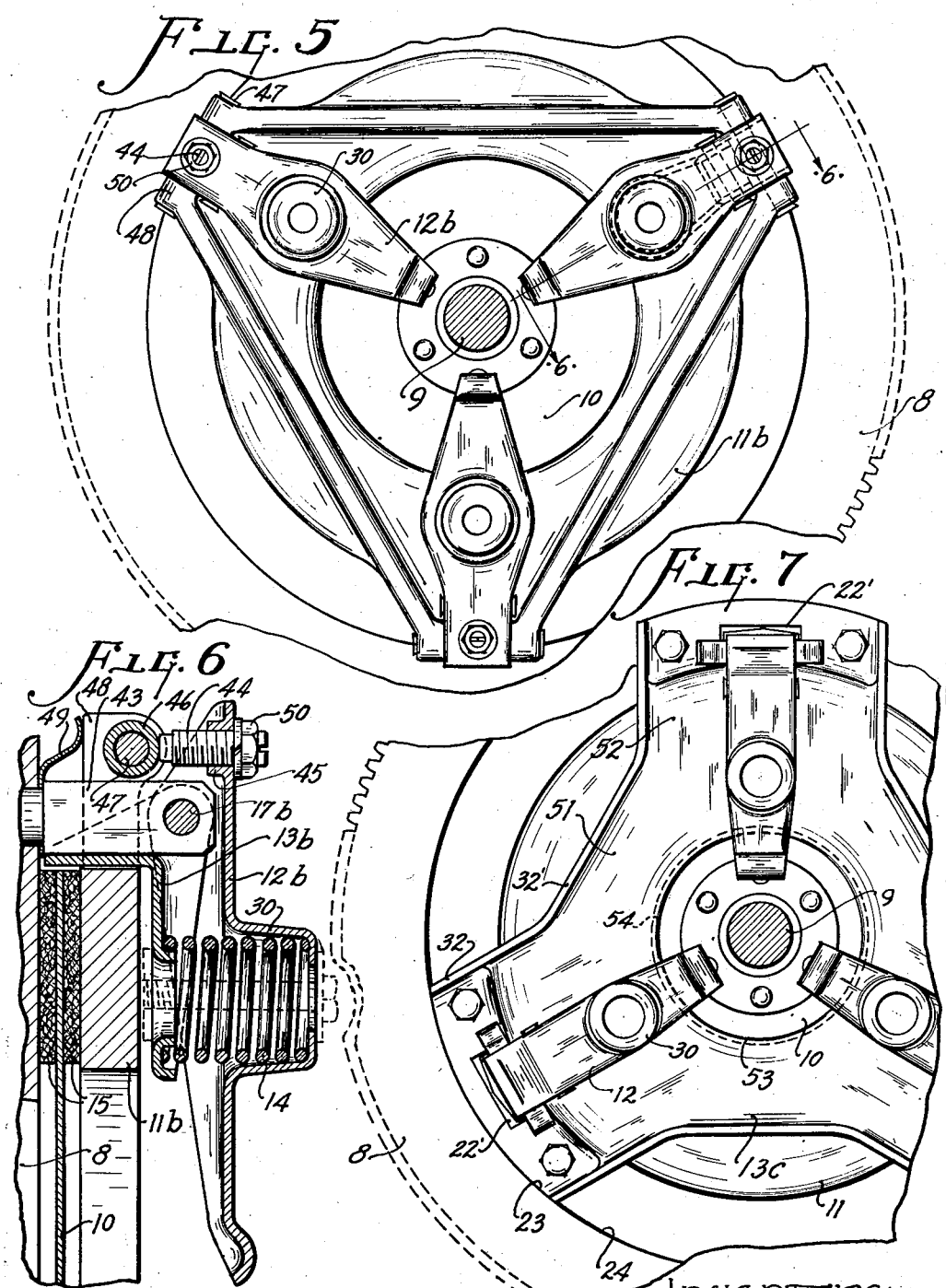

1,985,301

UNITED STATES PATENT OFFICE 1,985,301

FRICTION CLUTCH

Carl A. Thelander and W. Vincent Thelander, Rockford, Ill.

Application October 10, 1932, Serial No. 637,070

16 Claims. (Cl. 192—68)

Our invention relates to friction clutches specially designed and adapted for use on automobiles, tractors, and industrial applications.

Friction clutches have been designed eliminating the usual back plate, with a view to simplicity and economy in construction, but, so far as we are aware, such clutches have not been adopted commercially because service tests proved them to be impractical for one reason or another. It is, therefore, the principal object of our invention to provide a clutch of the type referred to but of more practical and serviceable design and simpler construction, and considerably cheaper to manufacture than the present standard type clutches using back plates.

A salient feature of our invention lies in the use of sheet metal stampings not only for the pressure transmitting levers but also for the brackets constituting their supports, thus making for lightness, cheapness, and durability, as well as greater uniformity in quantity production, because of the reduction in the number of machining operations required.

Another feature of our invention consists in the provision of a separate spring for each pressure transmitting lever mounted in such a way that the lever multiplies the pressure of the spring so as to insure positive engagement of the clutch, although the springs are disposed so that there is a certain mechanical advantage in the operation of the levers in overcoming the action of the springs in disengagement of the clutch, whereby to make for light pedal action.

Still another feature consists in the provision of a simple form of take-up adjustment which is easily accessible and permits an adjustment to be made more accurately and expeditiously than in previous constructions.

The invention is illustrated in the accompanying drawings, in which—

Figure 1 is a rear view of a clutch embodying our invention;

Fig. 2 is a section on the line 2—2 of Figure 1 on an enlarged scale;

Fig. 3 is an end view of one of the lever assemblies appearing in Figure 1;

Fig. 4 is a view similar to Fig. 2 showing a modified or alternative construction;

Figs. 5 and 6 are views similar to Figs. 1 and 2, respectively, showing another modified or alternative construction, and Fig. 7 is a view similar to Figure 1 showing a still further modified or alternative construction.

Similar reference numerals are applied to corresponding parts throughout the views.

Referring first to Figs. 1 to 3, the reference numeral 8 is applied to a flywheel mounted in the usual way on the rear end of the engine crank shaft (not shown), whereby to constitute the driving element. A shaft indicated at 9 constitutes the driven element and extends rearwardly into the gear box of the transmission, there being a housing about the flywheel and clutch assembly at the front end of the gear box, as is well known. The clutch comprises a disk 10 carried on a hub splined on the front end of the shaft 9, in the usual way, and a pressure plate 11 arranged to engage the disk 10 with the flywheel 8. In the conventional clutch, a plurality of springs are provided acting between the pressure plate and a back plate bolted onto the rim of the flywheel normally to keep the clutch firmly engaged, and levers are provided acting between the pressure plate and the back plate to disengage the clutch against the action of the springs. In the present case, however, a plurality of pressure transmitting levers 12 are mounted on brackets 13 carried on the flywheel 8, and have springs 14 acting between the brackets 13 and the levers 12 to urge the levers 12 in the proper direction to apply pressure to the pressure plate 11 to frictionally engage the disk 10 between the pressure plate and flywheel. The usual pads or facings 15 are provided on the opposite sides of the disk around the margins thereof to give the desired engagement between the disk 10 and the face on the flywheel, and between the disk 10 and the face on the pressure plate. Each lever 12 is pivoted near its outer end 16 on the bracket 13, as at 17, and the spring 14 is disposed so as to be active against the lever near its inner end 18, whereby to secure the desired pressure multiplication and make for more positive engagement of the clutch. While the pressure of the springs is multiplied through the levers, it is nevertheless apparent that there is a certain mechanical advantage in the disengagement of the clutch, so far as the compression of the springs 14 by means of the levers 12 is concerned, the levers being operated from their inner ends 18 by means of the usual throwout collar by depression of the clutch pedal. The mechanical advantage means lighter pedal action. The operation of the levers 12 in disengagement of the clutch simply results in the compression of the springs 14 between the brackets 13 and the levers 12, leaving the pressure plate 11 free to float away from the flywheel under action of springs, hereinafter mentioned, so as not to transmit drive any longer to the clutch disk 10. Another advantage of this location of the springs with respect to the pivot for the levers is that it means very little loss of spring pressure when the clutch facings 15 become worn, whereas if the springs were disposed at the inner ends of the levers there would be appreciable expansion of the springs resulting from slight wear of the clutch facings, and consequently considerable loss of spring pressure.

A set screw 19 is threaded in the pressure plate 11 adjacent the outer end 16 of each of the levers 12 and has the head end thereof disposed for engagement by the end of the lever, as shown, whereby to transmit pressure to the plate for the engagement of the clutch. It will be observed that a lock nut 20 is provided in connection with each of these screws to jam against the back of the pressure plate and thus hold the screw in adjusted condition. These set screws 19 are received in radially projecting lugs 21 formed on the pressure plate 11 and projecting through slots 22 provided therefor in the brackets 13. The brackets 13 have the peripheries thereof struck on an arc, as indicated at 23 (Figure 1), of the same radius as a counterbore 24 on the flywheel, so that they can be accurately located prior to fastening the same with bolts 25. The latter are received in tapped holes provided therefor in the flywheel, registering with holes punched in the brackets 13. The brackets, when bolted to the flywheel in the manner stated, serve to transmit drive to the pressure plate 11 by virtue of the engagement of the lugs 21 in the slots 22. The pressure plate, therefore, turns with the flywheel as a unit, and the slots 22 are elongated so as to permit the lugs 21 to slide back and forth therein to the extent required in the engagement and disengagement of the clutch. The pressure plate is preferably urged away from the flywheel under the light pressure of U-shaped leaf springs 26 mounted on the lugs 21 under the lock nuts 20, and each having the arms thereof reaching forwardly with the free ends thereof curled, as at 27, to slide freely on the bracket 13. There is sufficient divergence of the arms of each of the springs 26 so that the same serve as compression springs tending normally to urge the pressure plate away from the flywheel, but under such light pressure that it is insignificant as compared with the heavy pressure which is active on the pressure plate in the engagement of the clutch.

We would now call attention to the fact that the levers 12 and brackets 13 are made in the form of sheet metal stampings for lightness and cheapness, as well as greater uniformity in production. The levers 12 are of elongated form, generally channel-shaped in cross-section, whereby to have longitudinal reenforcing flanges 28 to lend stiffness and durability. The ends 16 and 18 are formed by punching the web portion 29 in opposite directions so as to present rounded faces for engagement with the set screws 19 and the throwout collar, respectively. Near the inner end of each lever, a rearwardly protruding boss 30 is formed in the web portion 29 to provide a seat for the rear end of the spring 14. An opening 31 is also provided centrally of the rear wall of this boss to lighten the lever and also permit entering a bolt through the lever and spring to hold the spring compressed between the lever and its bracket 13 for a purpose which will soon appear. Each bracket 13 is generally of segmental form, that is to say, approximately triangular but with the base of the triangle arcuate. The bracket is also generally channel-shaped in cross-section so as to provide the longitudinal reenforcing flanges 32 for stiffness and durability. Approximately centrally of the bracket, a boss 34 is punched up to provide a support for the pivot pin 17. The boss is received between the flanges 28 of the lever 12, and the pin is entered through registering holes in the flanges 28 and in the side walls of the boss 34, the projecting ends of the pin being then preferably swedged, as indicated at 35 (Figure 1), to make a permanent assembly. The bracket is formed at its inner end, that is, at the apex portion of the segment or triangle, to provide a forwardly projecting boss 36 to serve as a seat for the front end of the spring 14. The pressure plate 11 may or may not be cut away, as indicated at 37, to accommodate each of these bosses, and, if desired, the bosses may be formed so as to have a working fit in these recesses, whereby to provide a further means of transmitting torque from the flywheel to the pressure plate. That, however, is not necessary where the lugs 21 on the pressure plate have a working fit in the slots 22 provided in the brackets. An opening 38 is also provided centrally of the front wall of the boss 36, concentric with the opening 31, previously mentioned. This makes for lightness in the bracket and also permits entering a bolt through the spring from the lever 12 to the bracket 13 to compress the spring 14 and hold it in compressed condition when the clutch is assembled at the factory for shipment to the motor car manufacturer, as indicated in dotted lines in Fig. 6. In other words, a pressure plate can be made up with its full complement of brackets 13 and levers 12, ready for bolting to the back of a flywheel, and shipped in that condition to the motor car manufacturer, so that it is only necessary to enter the bolts 25 in the brackets to fasten the clutch to the flywheel, whereupon the bolts holding the springs 14 compressed can be removed and the clutch is then completely assembled on the flywheel. Another thing that can be done, instead of using bolts in the manner described, is to insert shims as shown in dotted lines in Fig. 2 between the brackets 13 and the lugs 21 on the pressure plate, to hold the springs 14 compressed sufficiently to permit bolting the brackets to the flywheel, the shims becoming loose when the bolts are tightened on the flywheel, so that they can be removed and thus leave the pressure plate under the pressure of the springs 14.

It will be seen from the foregoing description that we have provided a clutch of extremely simple, economical, and practical construction. It can be installed in a fraction of the time otherwise required with clutches having back plates. The clutch when installed is, furthermore, completely visible from the back of the flywheel so that the matter of inspection and adjustment is greatly facilitated. The complete exposure of all of the parts is also highly advantageous from the standpoint of the parts keeping cool in operation, there being very good ventilation. Furthermore, there is a good opportunity for any dirt or worn-off particles from the clutch disk to escape from the clutch by centrifugal action in the operation of the clutch. The light sheet metal construction of the pressure transmitting levers and the relationship of the inner ends thereof with respect to the pivot pins 17 is such that centrifugal effects at higher speeds are not noticeable.

In Fig. 4, we have shown another construction similar to that of Figs. 1 to 3 in which the pressure transmitting lever 12a and its supporting bracket 13a are the same as the lever 12 and bracket 13, except as regards the portions having to do with the spring 14, the boss 30 being omitted on the lever and the boss 36 on the bracket, because of the substitution of a grasshopper type spring 14a. The spring 14a has two coils 39 disposed on opposite sides of the lever 12a on the projecting ends of the pivot pin 17a. The spring arms 40 on opposite sides of the lever are interconnected by a cross portion 41 having abutment with the front of the inner end 18 of the lever, and the spring arms 42 on opposite sides of the lever have abutment on the bracket 13a, as shown, so that the lever 12a is urged in a counterclockwise direction with respect to the pivot pin 17a to apply pressure at its outer end 16 on the set screw 19 so as to urge the pressure plate 11 toward the flywheel for engagement of the clutch. The operation of a clutch of this construction is so similar to that of the one previously described as to require no explanation.

Referring now to Figs. 5 and 6, showing another clutch construction, it will be observed that the pressure transmitting levers 12b correspond more closely to the pressure transmitting levers 12, in so far as they have bosses 30 to receive coiled compression springs 14. The brackets 13b are, however, of a different form from the brackets 13 or 13a in that they are constructed for support on studs 43 suitably secured to and projecting rearwardly from the flywheel 8. The pivot pin 17b, in this construction, serves as a means for supporting the bracket 13b on the stud 43, and as a means of pivotally supporting the pressure transmitting lever 12b. It will be noticed that the pressure of the spring 14 is transmitted to the pressure plate 11b from the lever 12b by means of a set screw 44 threaded in a neck 45 punched inwardly from the web portion of the lever. The smooth inner end of the screw 44 has line contact with a roller 46 mounted rotatably on a pin 47 received in the bifurcated lug 48 on the pressure plate. The stud 43 together with the bracket 13b is received in the bifurcated lug, whereby to transmit torque from the flywheel to the pressure plate 11b. Leaf springs 49, clamped in place on the flywheel by the studs 43 engage the front of the pressure plate at the lugs 48 to tend normally to urge the pressure plate away from the flywheel under light spring pressure for more positive disengagement of the clutch. A lock nut 50 threads on the rear end of each of the set screws 44 and jams against the back of the lever 12b to hold the set screw in adjusted position. It is manifest that the operation of this clutch corresponds so closely to that of the other two, just described, that no explanation is necessary.

In Fig. 7, there is illustrated a construction, generally similar to that of Figs. 1 to 3, in so far as the pressure transmitting levers 12 and their appurtenances are concerned, but in which the three brackets 13 are united in a single bracket 13c, whereby to have one sheet metal stamping instead of three, and correspondingly simplify assembling. With a construction of this kind, the slot 22 is continued into the flange abutting the back of the flywheel to a point where the outer ends of the lugs 21 will clear the ends of the slots as the pressure plate 11 is brought into position. The outer ends of these slots are indicated at 22' in Fig. 7. The webs 51 interconnecting the three lever supports 52 have flanges 32' projecting rearwardly therefrom and formed as continuations of flanges 32 on lever supports 52. A central opening 53 is formed in the bracket 13c for the extension therethrough of the driven shaft 9, and, if desired, an annular flange may be provided projecting forwardly from the bracket 13c to define the opening 53, as indicated in dotted lines. The operation of this clutch corresponds to that of the clutch of Figs. 1 to 3.

It is believed that the foregoing description conveys a good understanding of all of the objects and advantages of our invention. The appended claims have been drawn so as to cover all legitimate modifications and adaptations.

We claim:

1. In a clutch comprising a flywheel constituting the driving element, and a clutch disk constituting the driven element, a pressure plate for holding the clutch disk frictionally engaged with the flywheel, said flywheel having a circular shoulder projecting from the back thereof concentric with the axis of flywheel rotation, a plurality of separate and independent lever supporting brackets arranged to be detachably secured to the flywheel in equally circumferentially spaced relation, said brackets each having an arcuate portion of the same radius as the aforesaid shoulder for abutment with said shoulder for location of the brackets in centered relation to the flywheel, means for detachably securing said brackets to the flywheel, a plurality of levers for communicating movement to the pressure plate pivotally mounted on said brackets, and spring means tending normally to move said plate forwardly for engagement of the clutch, said levers being adapted to be moved manually for disengagement of the clutch, the pressure plate having a plurality of radially projecting lugs provided thereon in equally circumferentially spaced relation, said brackets being formed to receive said lugs so as to locate the brackets in equally spaced relation and facilitate assembling of the brackets on the flywheel, the said lugs serving moreover as a means of transmitting drive to the pressure plate from the flywheel through the brackets, and as a means of guiding said presure plate for movement toward and away from the flywheel in the engagement and disengagement of the clutch.

2. In a clutch comprising a flywheel constituting the driving element and a clutch disc constituting the driven element, a pressure plate for holding the clutch disc frictionally engaged with the flywheel, a plurality of separate and independent lever supporting brackets arranged to be detachably secured to the flywheel in circumferentially spaced relation, each of said brackets having an outer end portion engaging an abutment on the flywheel to locate said brackets all at the same distance from center, means for detachably securing said brackets to the flywheel, a plurality of levers for communicating movement to the pressure plate pivotally mounted on said brackets, and spring means tending normally to move said plate forwardly for engagement of the clutch, said levers being adapted to be moved manually for disengagement of the clutch, the pressure plate having a plurality of radially projecting lugs provided thereon in equally circumferentially spaced relation, said brackets being formed to receive said lugs so as to locate the brackets in equally spaced relation and facilitate assembling of the brackets on the flywheel, the said lugs serving moreover as a means of transmitting drive to the pressure plate from the flywheel through the brackets, and as a means of guiding said pressure plate for movement toward and away from the flywheel in the engagement and disengagement of the clutch.

3. In a clutch comprising a flywheel constituting the driving element and a clutch disc constituting the driven element, a pressure plate for holding the clutch disc frictionally engaged with the flywheel, a plurality of separate and independent lever supporting brackets arranged to be detachably secured to the flywheel in circumferentially spaced relation, each of said brackets having an outer end portion engaging an abutment on the flywheel to locate said brackets all at the same distance from center, means for detachably securing said brackets to the flywheel, a plurality of levers for communicating movement to the pressure plate pivotally mounted on said brackets, and spring means tending normally to move said plate forwardly for engagement of the clutch, said levers being adapted to be moved manually for disengagement of the clutch, the pressure plate having a plurality of radially projecting lugs provided thereon in equally circumferentially spaced relation, said brackets being formed to receive said lugs so as to locate the brackets in equally spaced relation and facilitate assembling of the brackets on the flywheel, the said lugs serving moreover as a means of transmitting drive to the pressure plate from the flywheel through the brackets, and as a means of guiding said pressure plate for movement toward and away from the flywheel in the engagement and disengagement of the clutch, the spring means having abutment with said levers, and said clutch including means for transmitting pressure from said levers to the pressure plate, said means being operative on said lugs.

4. In a clutch comprising a driving element and a driven element, a pressure plate for holding the driving and driven elements frictionally engaged, a plurality of levers for communicating movement to the pressure plate under spring pressure whereby to cause engagement of the clutch, a plurality of springs equal in number to the levers and each active against one of said levers for applying pressure to the pressure plate, and a separate support for each of said levers for supporting the same on the driving element, each of said supports comprising a pivot for the lever, near the outer end of the latter, and a seat for the spring cooperating with said lever so disposed that the spring engages the lever between the pivot and the inner end of the lever, the outer end being active on the pressure plate and the inner end being manually operable.

5. In a clutch comprising a driving element and a driven element, a pressure plate for holding the driving and driven elements frictionally engaged, a plurality of levers for communicating movement to the pressure plate under spring pressure whereby to cause engagement of the clutch, an equal number of springs each active against one of said levers for applying pressure to the pressure plate, each of said levers being made of sheet metal elongated in form and generally channel-shaped in cross-section, whereby to provide a pair of opposed longitudinal reinforcing and supporting flanges on the lever, and a separate supporting bracket for each of said levers for supporting the same on the driving element, each of said brackets comprising one outer end portion for detachably securing the same to the driving element, an intermediate portion for reception between the flanges of the lever for pivotally supporting said lever on the bracket, and an inner end portion serving as a seat for one end of the spring so that the latter cooperates with said lever between the pivot and the inner end of the lever.

6. In a clutch comprising a driving element and a driven element, a pressure plate for holding the driving and driven elements frictionally engaged, a plurality of levers for communicating movement to the pressure plate under spring pressure whereby to cause engagement of the clutch, an equal number of springs each active against one of said levers for applying pressure to the pressure plate, each of said levers being made of sheet metal elongated in form and generally channel-shaped in cross-section, whereby to provide a pair of opposed longitudinal reinforcing and supporting flanges on the lever, and a separate supporting bracket for each of said levers for supporting the same on the driving element, each of said brackets comprising one portion for detachably securing the same to the driving element, another portion for reception between the flanges of the lever for pivotally supporting said lever on the bracket, and a third portion serving as a seat for one end of the spring cooperating with said lever, the lever having the web portion of the channel formed to provide a projecting boss to serve as a seat for the other end of the spring.

7. In a clutch comprising a driving element and a driven element, a pressure plate for holding the driving and driven elements frictionally engaged, a plurality of levers for communicating movement to the pressure plate under spring pressure whereby to cause engagement of the clutch, an equal number of springs each active against one of said levers for applying pressure to the pressure plate, each of said levers being made of sheet metal elongated in form and generally channel-shaped in cross-section, whereby to provide a pair of opposed longitudinal reinforcing and supporting flanges on the lever, and a separate supporting bracket for each of said levers for supporting the same on the driving element, each of said brackets comprising one portion for detachably securing the same to the driving element, another portion for reception between the flanges of the lever for pivotally supporting said lever on the bracket, and a third portion serving as a seat for one end of the spring cooperating with said lever, each of said brackets being formed to provide an opening between the attaching portion and the pivot portion, the pressure plate having a lug provided on the periphery thereof extending through said opening, whereby to transmit torque to the pressure plate from the driving element, the said lug being disposed with respect to the adjacent end of the lever mounted on said bracket so as to have movement communicated to the pressure plate in the movement of said lever.

8. In a friction clutch comprising a flywheel serving as a driving element, and a clutch disk serving as a driven element, a pressure plate for holding the clutch disk frictionally engaged with the flywheel, said plate having a plurality of equally circumferentially spaced drive lugs projecting radially from the periphery thereof, a plurality of brackets mounted on the flywheel and slidably engaged by said lugs whereby to transmit drive from the flywheel to the pressure plate while permitting movement of the latter toward and away from the flywheel, levers pivotally supported near their outer ends on said brackets so that their outer ends are disposed for engagement with said lugs to transmit pressure to the pressure plate, screw adjustments for changing the operative relationship between said lugs and the ends of said levers, and springs supported on said brackets and engaging said levers between the pivots therefor and their inner ends, said levers being operable manually at their inner ends, whereby to release the spring pressure from said pressure plate.

9. A clutch as set forth in claim 8, including spring means between the flywheel and the lugs on said pressure plate for normally urging the latter away from the flywheel under light spring pressure.

10. A clutch as set forth in claim 8, wherein each of the screw adjustments comprises a set screw threaded in the lug on the pressure plate with the outer end disposed for engagement by the outer end of the lever cooperating therewith and a lock nut threading on the screw to jam against the face of said lug, the clutch including a leaf spring mounted on said lug so as to be clamped by one portion thereof between said lock nut and said lug, said spring having another portion extending forwardly from the lug and exerting pressure against the back of the flywheel.

11. In a friction clutch, the combination with a flywheel constituting the driving element, and a clutch disk constituting the driven element, said disk having friction material on the margins thereof for engagement with the flywheel, of a pressure plate for holding the disk engaged with the flywheel in driving relation, radially disposed levers for communicating movement to the pressure plate, said levers being manually operable at their inner ends to release the clutch, supports for said levers mounted on the flywheel in equally, circumferentially spaced relation with reference to the periphery of the pressure plate, said levers being pivoted near their outer ends on said supports and being arranged to communicate pressure at their outer ends to the pressure plate said supports being constructed to reach rearwardly from the flywheel and inwardly behind the pressure plate so as to leave the pressure plate and disk exposed between the supports to permit ventilation of the plate and the escape of worn particles of friction material from the disk, and spring means acting between the inwardly directed portion of said supports and the levers normally tending to urge the pressure plate toward the flywheel.

12. In a friction clutch comprising a flywheel serving as a driving element, and a clutch disk serving as a driven element, a pressure plate for holding the clutch disk frictionally engaged with the flywheel, said plate having a plurality of equally circumferentially spaced drive lugs projecting radially from the periphery thereof, means for supporting levers carried on the flywheel and slidably engaged by said lugs whereby to transmit drive from the flywheel to the pressure plate while permitting movement of the latter toward and away from the flywheel, levers pivotally supported near their outer ends on said supporting means so that their outer ends are disposed for engagement with said lugs to transmit pressure to the pressure plate, screw adjustments for changing the operative relationship between said lugs and the ends of said levers, and springs supported on the supporting means and engaging said levers between the pivots therefor and their inner ends, said levers being operable manually at their inner ends whereby to release the spring pressure from said pressure plate.

13. In a friction clutch, comprising a flywheel driving element and a clutch disc driven element, a pressure plate for holding the clutch disc frictionally engaged with the flywheel, a plurality of lever supporting brackets generally triangular shaped and disposed in circumferentially spaced relation on the flywheel adjacent the periphery of the clutch disc and pressure plate with the apex of each extending inwardly toward the axis of rotation and the broader base portion of each disposed outermost, means detachably securing the broader base portions of said brackets to the flywheel, radially disposed levers each pivotally mounted near its outer end centrally on one of said brackets, spring means between the apex of the bracket and the lever normally urging the lever in one direction so that the outer end moves toward the flywheel, and means for transmitting spring pressure from the outer end of each lever to the pressure plate, said levers being operable manually in the other direction at their inner ends against the action of said spring means.

14. A clutch as set forth in claim 13 wherein the base portion of each of said brackets is offset forwardly from the plane of the rest of the bracket and connected therewith by a transverse wall extending alongside the periphery of the pressure plate, the latter having a drive lug reaching through an opening provided in said wall and movable in said opening toward and away from the flywheel, the means for transmitting spring pressure from the outer end of the lever to the pressure plate cooperating with said lug.

15. A clutch as set forth in claim 13 wherein the base portion of each of said brackets is offset forwardly from the plane of the rest of the bracket and connected therewith by a transverse wall extending alongside the periphery of the pressure plate, the latter having a drive lug reaching through an opening provided in said wall and movable in said opening toward and away from the flywheel, the means for transmitting spring pressure from the outer end of the lever to the pressure plate cooperating with said lug, and said means including a screw adjustment on said lug for changing the operative relationship between the lug and the outer end of the lever.

16. In a clutch, the combination of driving and driven members having surfaces adapted to engage, a pressure member for causing engagement of said surfaces, a pressure transmitting lever pivotally supported near the outer end thereof which is arranged to transmit pressure to the pressure member, spring means acting between the pivot and the inner end of said lever at such a distance from the pivot that the pressure of the spring is multiplied in the action of the lever on the pressure member, said lever being movable manually in the other direction at its inner end at a point farther removed from the pivot than the aforesaid spring means, whereby to secure mechanical advantage in relieving the spring pressure from the pressure member.

CARL A. THELANDER.
W. VINCENT THELANDER.